No. 864,243. PATENTED AUG. 27, 1907.
W. S. HOVEY.
VARIABLE SPEED AND REVERSING GEAR.
APPLICATION FILED AUG. 4, 1905.
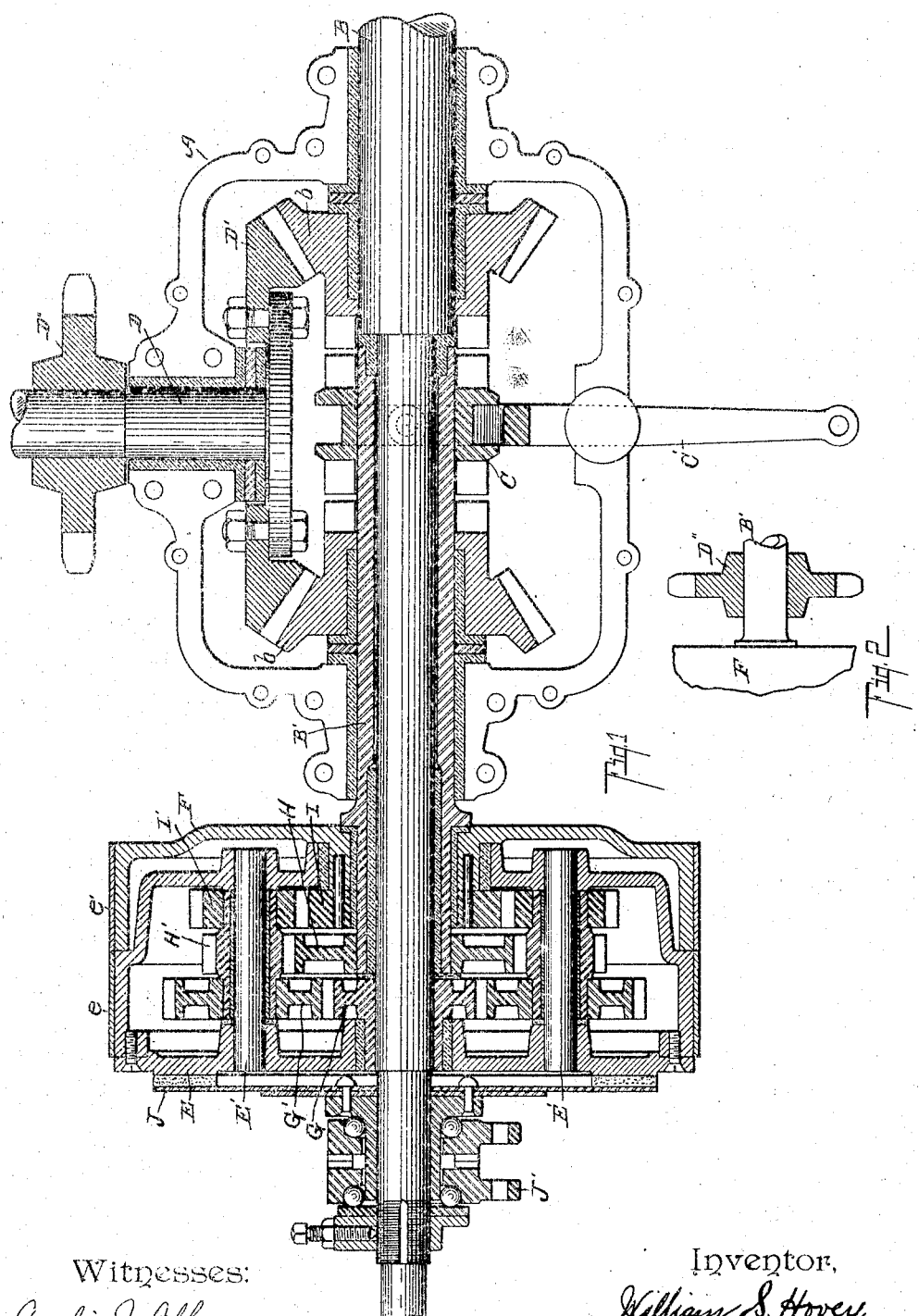
Witnesses:
Amelia J. Alber.
Ethel A. Bedford.
Inventor,
William S. Hovey
By Chappell & Earl
Att'ys

UNITED STATES PATENT OFFICE.

WILLIAM S. HOVEY, OF THREE RIVERS, MICHIGAN, ASSIGNOR TO SHEFFIELD CAR COMPANY, OF THREE RIVERS, MICHIGAN.

VARIABLE SPEED AND REVERSING GEAR.

No. 864,243.

Specification of Letters Patent.

Patented Aug. 27, 1907.

Application filed August 4, 1905. Serial No. 272,701.

*To all whom it may concern:*

Be it known that I, WILLIAM S. HOVEY, a citizen of the United States, residing at Three Rivers, county of St. Joseph, State of Michigan, have invented certain new and useful Improvements in Variable-Speed and Reversing Gear, of which the following is a specification.

This invention relates to improvements in variable speed and reversing gear.
My improved variable speed and reversing gear is particularly adapted for use in connection with railway motor cars, although it is adapted for use in other relations.

The objects of this invention are, first, to provide an improved variable speed and reversing gear by means of which the power may be transmitted to drive the car in either direction at the same speeds. Second, to provide an improved variable speed and reversing gear adapted to accomplish these results, which is simple in structure and in operation. Third, to provide an improved variable speed gearing which is simple and economical in structure and at the same time strong and durable.

Further objects, and objects relating to structural details, will definitely appear from the detailed description to follow.

I accomplish the objects of my invention by the devices and means described in the following specification.
The invention is clearly defined and pointed out in the claims.

A structure embodying the features of my invention is clearly illustrated in the accompanying drawing forming a part of this specification, in which—
Figure 1 is a detail longitudinal section of a structure embodying the features of my invention, the crankshaft B and the driven shaft D being shown in full lines. Fig. 2 is a detail view, partially in section, of a modified structure, the main reverse being eliminated.
In the drawing similar letters of reference refer to similar parts in both views.

Referring to the drawing, I provide a suitable supporting frame A for the operative parts. This frame is preferably made up of half-sections, for convenience in assembling, the top section being omitted in the drawing, so that the arrangement of the parts will more clearly appear.

A motor crank or driving shaft B is arranged in suitable bearings in the frame A. A sleeve B' is revolubly mounted on the shaft B. The sleeve B' is connected to the shaft D by means of the variable speed gearing, which I will now describe.

A gear G is suitably secured to the driving shaft B. A gear H is suitably secured to the sleeve B'. Two
sets of planetary gears, G', H' and I' are provided.
These gears are supported by suitable pins or journals E' carried by the main drum or casing E, which is revolubly mounted on the shaft B. The gears G', H' and I' are secured together. The gear G' is arranged to mesh with the gear G on the driving shaft, and the gear H' is arranged to mesh with the gear H on the sleeve B'. The gear I' is arranged to mesh with a gear I, which is secured to the drum F. The gear I and the drum F are revolubly mounted upon the sleeve B'.

A friction plate J is arranged to be adjusted to clamp the head of the drum E. This friction plate is connected to the crankshaft by means of a suitable clutch mechanism, as J', the details of which are not here illustrated, as it forms no part of this invention. Any suitable means may be used. By clamping the friction plate against the drum head the drum is locked to the driving shaft, thus locking the gear so that the whole is revolved as a solid construction, giving a high speed to the car.

The drum E is provided with a brake band e which is arranged on its periphery, and the drum F is provided with a similar brake band e'. By means of these brake bands the drums may be locked against rotation. The operating means for these brake bands are not here illustrated, as the construction of such means is well known.

I secure a reduced speed by locking the drum E by means of its brake-band e. This prevents its rotation, and the reduced speed is secured by means of the reduction gears G, G', H and H'. The gear I and the drum F, when the parts are thus arranged, are free to turn upon their bearings.

I secure a slow reversed speed by locking the drum F by means of its brake-band e'. By locking this drum, the gear I is locked, so that when the gear or pinion G' is driven by means of the gear G, the tendency will be to rotate these gears about the gear I in the opposite direction. This reverse movement drives the gear H on the sleeve B' in an opposite direction, as will be evident, thus obtaining a reverse.

In the structure I have illustrated, the gears for securing the reduction are of the ratio of 2 to 1. It is evident that any desired ratio within structural limits may be provided.

In motor cars, particularly for railroad use, it is desirable that the gear may be driven in either direction at the same speeds. I accomplish this result by means of a reverse mechanism, which I will now describe.

A jawed clutch collar C is slidably secured to the sleeve B' by any suitable means. A pair of beveled pinions b are revolubly mounted on the driving shaft and sleeve. These pinions are provided with suitable jaws adapted to be engaged by the jaws of the collar.

By this means either one or the other of the gears may be locked to the sleeve. A driven shaft D, on which the driving sprocket D'' is secured, is mounted on the frame A. On the inner end of this shaft are beveled gears D', arranged to mesh with the gear $b$. Thus arranged, by shifting the collar C—a lever C' being provided for that purpose—either of the gears $b$ may be locked to the sleeve B', as may be desired to drive the driven shaft D in the required direction.

In motor cars for railways, particularly locomotive hand cars and inspection cars such as are used for inspecting the road-bed, etc., many of the cars are too heavy to be lifted from the track and turned with convenience, and it is often inconvenient to run the same to a turntable. It is therefore very desirable that the car may be driven in either direction, at its full or reduced speeds. By means of the reversed speed in the transmission gearing I secure another speed at which the car may be run in either direction.

My improved gearing is comparatively simple and economical and at the same time is very efficient. The parts are so arranged that the strain thereon is reduced to a minimum and consequently the structure is very durable and is not likely to get out of repair.

While I have illustrated and described the structure in the form preferred by me on account of its structural simplicity and economy, I am aware that it is capable of considerable variation in structural details without departing from my invention.

Having thus described my invention, what I claim as new and desire to secure by Letters Patent, is:

1. The combination with a suitable frame, of a driving shaft; a sleeve revolubly mounted thereon; a gear secured to said driving shaft; a gear secured to said sleeve; a main drum or casing; a set of connected planetary gears, two of which are arranged to mesh with said gears on said driving shaft and sleeve; a spindle therefor carried by said main drum; an auxiliary drum or casing revolubly mounted on said sleeve; a gear revolubly mounted on said sleeve, secured to said auxiliary drum, and arranged to mesh with one of said planetary gears; means for locking said drums against rotation; a friction plate carried by said driving shaft, arranged to engage said main drum for locking the same to said driving shaft; a sprocket wheel; a driven shaft on which said sprocket wheel is mounted; a gear on said driven shaft; a pair of gears revolubly mounted on said sleeve and driving shaft, said gears having inwardly projecting clutch jaws thereon; a jawed clutch collar slidably secured to said sleeve, adapted to engage the jaws on said gear; and means for shifting said collar, for the purpose specified.

2. The combination with a suitable frame, of a driving shaft; a sleeve revolubly mounted thereon; a gear secured to said driving shaft; a gear secured to said sleeve; a main drum or casing; a set of connected planetary gears, two of which are arranged to mesh with said gears on said driving shaft and sleeve; a spindle therefor carried by said main drum; an auxiliary drum or casing revolubly mounted on said sleeve; a gear revolubly mounted on said sleeve, secured to said auxiliary drum and arranged to mesh with one of said planetary gears; means for locking said drums against rotation; a friction plate carried by said driving shaft, arranged to engage said main drum for locking the same to said driving shaft; a driven shaft; a gear on said driven shaft; a pair of gears revolubly mounted on said sleeve and said driving shaft, said gears having inwardly projecting clutch jaws thereon; a jawed clutch collar slidably secured to said sleeve, adapted to engage the jaws on said gear; and means for shifting said collar, for the purpose specified.

3. The combination with a suitable frame, of a driving shaft; a sleeve revolubly mounted thereon; a gear secured to said driving shaft; a gear secured to said sleeve; a main drum or casing; a set of connected planetary gears, two of which are arranged to mesh with said gears on said driving shaft and sleeve; a spindle therefor carried by said main drum; an auxiliary drum or casing revolubly mounted on said sleeve; a gear revolubly mounted on said sleeve, secured to said auxiliary drum and arranged to mesh with one of said planetary gears; means for locking said drums against rotation; a friction plate carried by said driving shaft, arranged to engage said main drum for locking the same to said driving shaft; a driven shaft; a gear on said driven shaft; a pair of revolubly mounted gears meshing therewith; and a clutch mechanism for locking said gears, for the purpose specified.

4. The combination with a suitable frame, of a driving shaft; a sleeve revolubly mounted thereon; a gear secured to said driving shaft; a gear secured to said sleeve; a main drum or casing; a set of connected planetary gears, two of which are arranged to mesh with said gears on said driving shaft and sleeve; a spindle therefor carried by said main drum; an auxiliary drum or casing revolubly mounted on said sleeve; a gear revolubly mounted on said sleeve, secured to said auxiliary drum and arranged to mesh with one of said planetary gears; means for locking said drums against rotation; a clutch mechanism for locking said main drum to said driving shaft; a driven shaft; a gear on said driven shaft; a pair of gears revolubly mounted on said sleeve and driving shaft, said gears having inwardly projecting clutch jaws thereon; a jawed clutch collar slidably secured to said sleeve, adapted to engage the jaws on said gear; and means for shifting said collar, for the purpose specified.

5. The combination with a suitable frame, of a driving shaft; a sleeve revolubly mounted thereon; a gear secured to said driving shaft; a gear secured to said sleeve; a main drum or casing; a set of connected planetary gears, two of which are arranged to mesh with said gears on said driving shaft and sleeve; a spindle therefor carried by said main drum; an auxiliary drum or casing revolubly mounted on said sleeve; a gear revolubly mounted on said sleeve, secured to said auxiliary drum and arranged to mesh with one of said planetary gears; means for locking said drums against rotation; a clutch mechanism for locking said main drum to said main driving shaft; a driven shaft; a gear on said driven shaft; a pair of revolubly mounted gears meshing therewith; and a clutch mechanism for locking said gears, for the purpose specified.

6. The combination with a suitable frame, of a driving shaft; a sleeve revolubly mounted thereon; a gear secured to said driving shaft; a gear secured to said sleeve; a drum or casing; gears arranged to mesh with said gears on said driving shaft and sleeve; a spindle therefor carried by said drum; means for locking said drum against rotation; a clutch mechanism for securing said drum to said driving shaft; a driven shaft; a gear on said driven shaft; a pair of gears arranged to mesh with said gear on said driven shaft, said gears having inwardly projecting jaws thereon; a jawed collar slidably secured to said sleeve, adapted to engage the jaws on said gears; and means for shifting said collar, for the purpose specified.

7. The combination with a suitable frame of a driving shaft; a sleeve revolubly mounted thereon; a gear secured to said driving shaft; a gear secured to said sleeve; a drum or casing; gears arranged to mesh with said gears on said driving shaft and sleeve; a spindle therefor carried by said drum; means for locking said drum against rotation; a clutch mechanism for securing said drum to said driving shaft; a driven shaft; a gear on said driven shaft; a pair of gears meshing therewith; and a clutch mechanism for securing said gears to said sleeve, for the purpose specified.

8. The combination with a suitable gear of a driving shaft; a sleeve revolubly mounted thereon; gear connections from said shaft to said sleeve; a clutch mechanism for connecting the same to said driving shaft; a driven shaft; a gear on said shaft; a pair of gears arranged to mesh with said gear on said driven shaft; said gears having inwardly projecting jaws thereon; a jawed collar slidably secured to said sleeve, adapted to engage the jaws on said gears; and means for shifting said collar, for the purpose specified.

9. The combination with a suitable frame of a driving shaft; a sleeve revolubly mounted thereon; gear connections for said shaft to said sleeve; a driven shaft; a gear on said driven shaft; a pair of gears arranged to mesh with said gear on said driven shaft, said gears having inwardly projecting jaws thereon; a jawed collar slidably secured to said sleeve, adapted to engage the jaws on said gears; and means for shifting said collar, for the purpose specified.

10. The combination with a suitable frame of a driving shaft; a sleeve revolubly mounted thereon; gear connections from said shaft to said sleeve; a clutch mechanism for connecting the same to said driving shaft; a driven shaft; a gear on said driven shaft; a pair of gears arranged to mesh with said gear on said driven shaft; and a clutch mechanism for securing said gears to said sleeve, for the purpose specified.

11. The combination with a suitable frame of a driving shaft; a sleeve revolubly mounted thereon; gear connections from said shaft to said sleeve; a driven shaft; a gear on said driven shaft; a pair of gears arranged to mesh with said gear on said driven shaft; and a clutch mechanism for securing said gears to said sleeve, for the purpose specified.

In witness whereof, I have hereunto set my hand and seal in the presence of two witnesses.

WILLIAM S. HOVEY. [L. S.]

Witnesses:
FRED. E. BUERGIN,
ALICE S. CALAHAN.